July 27, 1965 J. H. SIMON 3,197,556
INSULATING SLEEVE FOR GUIDING CABLES THROUGH A WALL OPENING
Filed Jan. 11, 1963 5 Sheets-Sheet 1
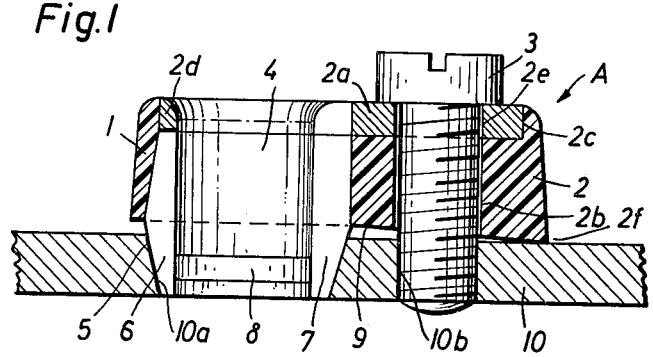
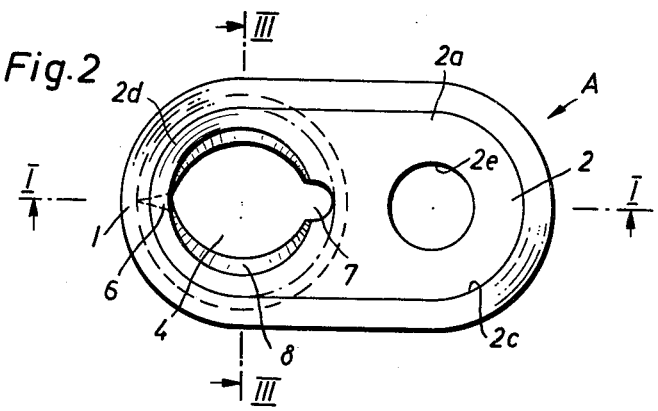
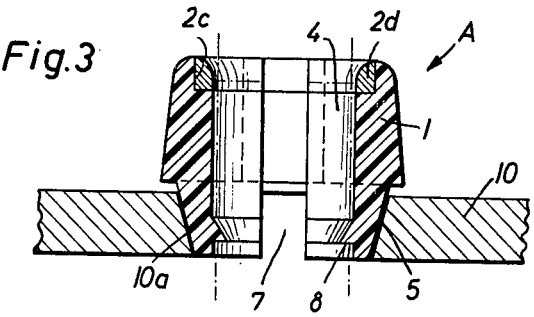
INVENTOR
JOHANN H. SIMON
BY MICHAEL S. STRIKER,
his ATTORNEY July 27, 1965

J. H. SIMON 3,197,556

INSULATING SLEEVE FOR GUIDING CABLES THROUGH A WALL OPENING

Filed Jan. 11, 1963

INVENTOR
JOHANN H. SIMON
BY MICHAEL S. STRIKER,
his ATTORNEY

July 27, 1965  J. H. SIMON  3,197,556
INSULATING SLEEVE FOR GUIDING CABLES THROUGH A WALL OPENING
Filed Jan. 11, 1963
5 Sheets-Sheet 3
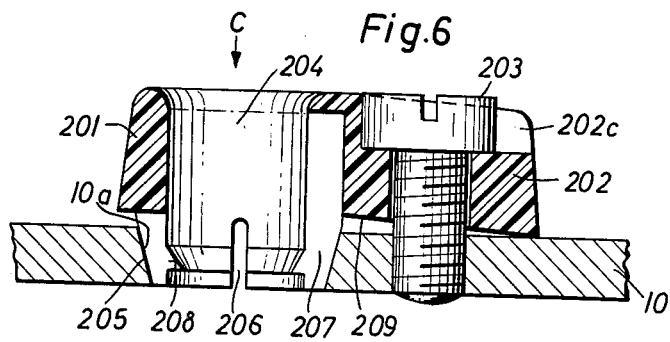
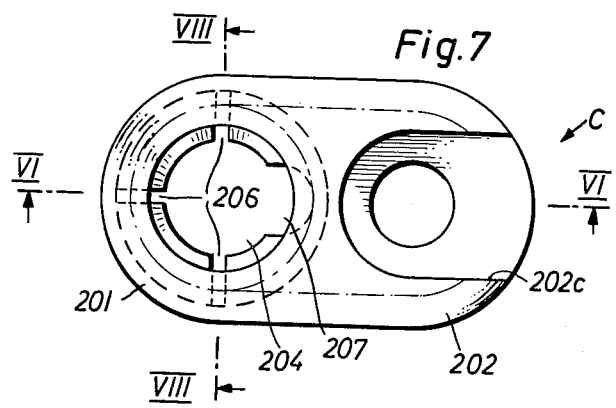
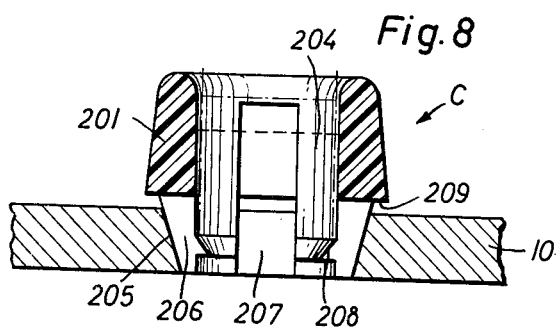
INVENTOR
JOHANN H. SIMON
BY MICHAEL S. STRIKER,
his ATTORNEY July 27, 1965 J. H. SIMON 3,197,556
INSULATING SLEEVE FOR GUIDING CABLES THROUGH A WALL OPENING
Filed Jan. 11, 1963 5 Sheets-Sheet 4
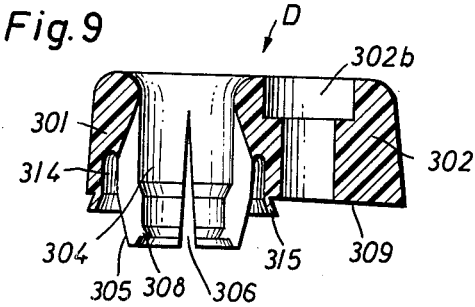
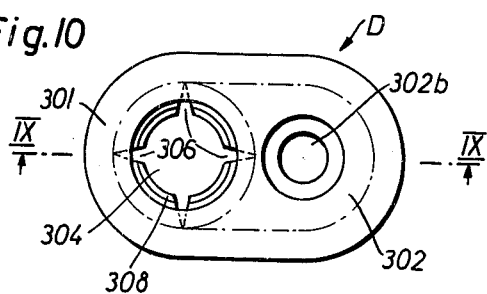
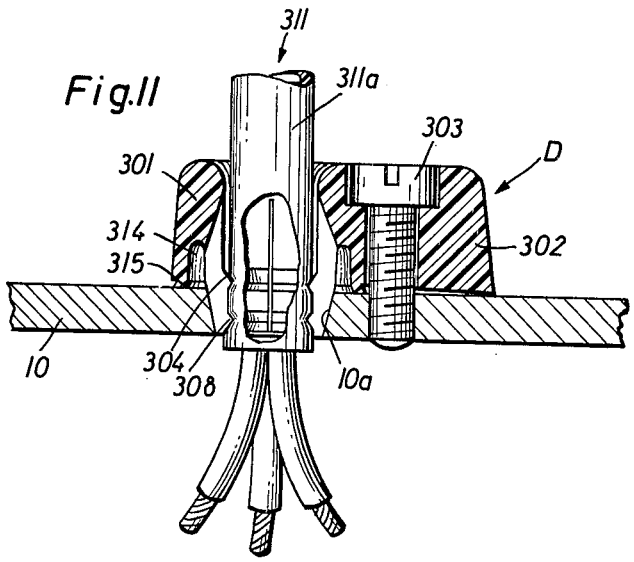
INVENTOR:
JOHANN H. SIMON
BY MICHAEL S. STRIKER
his ATTORNEY INVENTOR
JOHANN H. SIMON
BY MICHAEL S. STRIKER,
his ATTORNEY

United States Patent Office 3,197,556
Patented July 27, 1965

3,197,556
INSULATING SLEEVE FOR GUIDING CABLES
THROUGH A WALL OPENING
Johann Hans Simon, 8 Kirchstrasse,
Unkel (Rhine), Germany
Filed Jan. 11, 1963, Ser. No. 250,914
Claims priority, application Germany, Jan. 17, 1962,
S 77,580
15 Claims. (Cl. 174—153)

The present invention relates to insulators in general, and more particularly to an insulating sleeve which is especially suited for guiding electric cables through openings provided in the housings of current-consuming appartus, such as electric machines, various types of instruments and the like.

It is an important object of my invention to provide a very simple and inexpensive but highly reliable insulating sleeve which is capable of forming a fluid-tight seal between the jacket or shield of an electric cable and the wall of a housing through which the cable extends.

Another object of the invention is to provide an insulating sleeve of the just outlined characteristics which automatically engages and holds the cable against axial displacement when it is put to actual use.

A further object of the invention is to provide a self-locking insulating sleeve of the above outlined characteristics which is automatically anchored in the opening of a wall and which automatically holds the cable against axial movement as soon as it is properly inserted into such opening.

An additional object of the instant invention is to provide an insulating sleeve whose cable-engaging portion is automatically deformed into fluidtight engagement with a wall and with the cable when the sleeve is fully mounted on such wall, and wherein the cable-engaging portion is permitted to assume its normal undeformed condition as soon as the sleeve is at least partially disengaged from the wall.

A further object of the invention is to provide a sleeve of the above outlined characteristics which may be utilized as a means for guiding and anchoring single-conductor cables, multiple-conductor cables or cables having separate ground conduits, and whose construction is such that a ground conduit need not pass through a separate bore which would require additional fluidtight seals.

A concomitant object of the invention is to provide an insulating sleeve of the above outlined characteristics which may be manufactured from a variety of readily available materials and which may be reused as often as desired.

Still another object of the invention is to provide a current-consuming apparatus which comprises at least one sleeve of the above outlined characteristics.

With the above objects in view, one feature of the invention resides in the provision of an insulating sleeve which is particularly useful for guiding and holding electric cables passing through openings provided in the housings of current-consuming apparatus. In its simplest form, the sleeve comprises a preferably slotted nozzle of elastic material which is formed with a cable-receiving through bore and with at least one conical outer face diverging outwardly in a direction from the one toward the other axial end of the bore so that the nozzle is caused to contract in response to its introduction into an opening whose diameter is sufficiently small to cause radial contraction of the nozzle when the conical face passes through the opening. The nozzle then automatically engages the cable and holds it against axial displacement. If desired, the nozzle may be provided with projections which extend into the bore and which bite into the sheath or jacket of a cable, and such projections may form one or more toothed annuli which completely or nearly completely surround a portion of the bore.

In order to improve the sealing action of the sleeve, the latter may be provided with an annular collar which surrounds a portion of the nozzle and which is caused to sealingly engage one side of a wall into which the nozzle extends. Also, the sleeve may comprise one or more laterally projecting apertured extensions which may receive fastening means to provide a positive connection between the sleeve and a wall.

The novel features which are considered as characteristic of the invention are set forth in particular in the appended claims. The insulating sleeve itself, however, both as to its construction and its mode of application, together with additional features and advantages thereof, will be best understood from the following detailed description of certain specific embodiments with reference to the accompanying drawings, in which:

FIG. 1 is a longitudinal central section through an insulating sleeve which embodies one form of my invention and which is fastened to a wall structure, the section through the sleeve being taken along the line I—I of FIG. 2;

FIG. 2 is a top plan view of the insulating sleeve;

FIG. 3 is a transverse axial section through the nozzle of the insulating sleeve as seen in the direction of arrows from the line III—III of FIG. 2;

FIG. 6 is a longitudinal central section through a different insulating sleeve which is about to be fastened to a wall structure, the section through the sleeve being taken along the line VI—VI of FIG. 7;

FIG. 7 is a top plan view of the insulating sleeve which is shown in FIG. 6;

FIG. 8 is a transverse axial section through the nozzle of the insulating sleeve as seen in the direction of arrows from the line VIII—VIII of FIG. 7;

FIG. 9 is a longitudinal central section through a further insulating sleeve whose nozzle is formed with specially configurated axial slots, the section of FIG. 9 being taken along the line IX—IX of FIG. 10;

FIG. 10 is a top plan view of the insulating sleeve which is shown in FIG. 9;

FIG. 11 is a longitudinal central section through the sleeve of FIGS. 9 and 10, showing the sleeve in a position it assumes when it is sealingly fixed to a wall structure and when the bore of its nozzle receives a multi-conductor cable;

Figure 4:
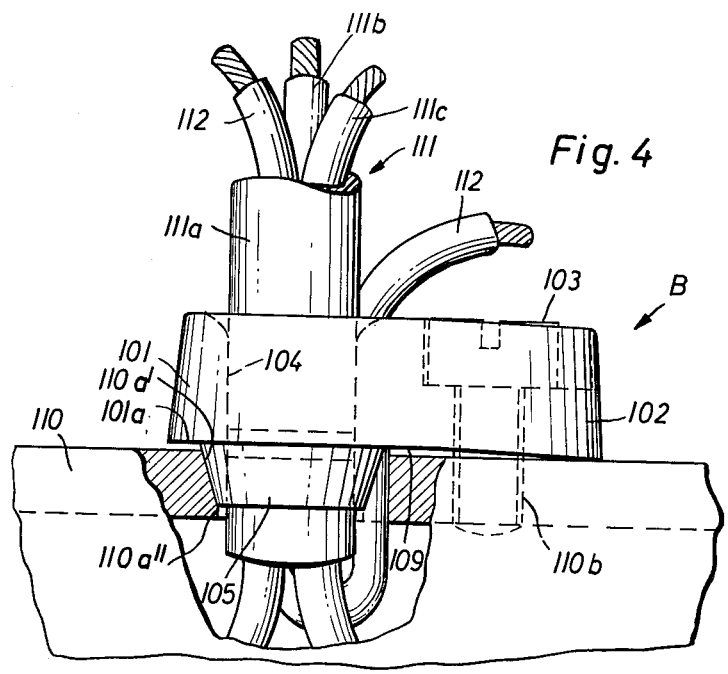
FIG. 4 is an elevational view of a housing which forms part of a current-consuming apparatus and which is connected with a slightly modified sleeve, a portion of the housing being broken away to reveal the opening which accommodates the nozzle of the insulating sleeve.

Referring now in greater detail to the drawings, and first to FIGS. 1 to 3, there is shown an insulating sleeve A which consists of tough, elastically deformable material, such as a suitable synthetic plastic substance, and which comprises two main component parts including a nozzle 1 and an extension or lug 2 which latter is integral with the nozzle at point adjacent to one axial end of a through bore 4 provided in the nozzle and serving to receive a portion of an electric cable, not shown. The nozzle 1 is formed with a conical outer face 5 which diverges from the lower axial end toward the upper axial end of the bore 4, as viewed in FIG. 1 or 3, and which is receivable in an opening 10a provided in a wall 10 forming part of a housing for current-consuming apparatus. This wall is formed with tapped bore 10b whose axis is parallel with the axis of the opening 10a and which receives a portion of a fastening member here shown as a threaded bolt 3 extending through an aperture 2b of the extension 2. The head of the bolt 3 abuts against the outer side of a stiffening plate 2a which is recessed into a depression or cutout 2c provided at the outer side of the extension, i.e., at that side of the extension which faces away from the lower end of the axial bore 4, as viewed in FIG. 1 or 3. The depression 2c also extends into the material of the nozzle 1 to receive an annular portion 2d of the stiffening plate 2a which thus surrounds one end of the bore 4.

The nozzle 1 is formed with an axially parallel slot 6 of triangular cross section which extends from the lower toward but short of the upper end of the bore 4 and which adds to the deformability of the nozzle when the latter is caused to enter the opening 10a in the wall 10. The bore 4 comprises a radially extending semicircular zone or cutout 7 which serves to accommodate ground conduit so that a multi-conductor cable passing through the bore 4 need not be sealed for a second time at the point where the ground conduit of this cable extends through the wall 10.

The underside 9 of the extension 2 is located in a plane which is normally inclined with respect to the outer side of the wall 10 and which makes an acute angle with the axis of the bore 4. However, when the bolt 3 is drawn tight, it tends to bias the extension 2 into face-to-face abutment with the outer side of the wall 10 and thereby compels the lower end portion of the nozzle 1 to penetrate into the opening 10a so that the nozzle is compressed radially inwardly and bears against the jacket or against the shield of a cable which passes through the bore 4. In order to insure that the cable is held against axial movement with respect to the nozzle, the latter is formed with two sickle-shaped projections 8 of triangular cross section which extend into the bore and which bite into the material of the cable to thereby hold the cable against angular and/or axial movements with respect to the nozzle. As shown in FIGS. 1 and 3, the projections 8 together form an annulus which nearly completely surrounds the bore 4. It will be readily understood that such projections may form two or more annuli or that, in some instances, the projections may be omitted altogether if the frictional engagement between the cable and the material of the nozzle is sufficient to hold the cable against undesirable axial and/or angular displacements. Each projection 8 may be formed with a toothed or serrated inner edge.

The stiffening plate 2a may consist of sheet metal or of rigid synthetic plastic material. It is also possible to make this plate of wood if it is desired to enhance the appearance of the sleeve.

The structure shown in FIG. 1 is assembled in the following manner:

In the first step, the operator inserts the plate 2a into the depression 2c and thereupon places the conical tip of the nozzle 1 into the opening 10a. In the next step, the operator introduces the bolt 3 through the registering apertures 2e, 2b of the parts 2a 2 and drives the bolt into the bore 10 so that the extension 2 pivots about its edge 2f and moves its underside 9 against the outer side of the wall 10. As a result of such movement of the extension 2, the nozzle 1 is caused to penetrate into the opening 10a whereby the conical outer face 5 compels the nozzle to contract radially inwardly and to move its projections 8 into firm engagement with the jacket or shield of a cable which passes through the bore 4. The conical face 5 then forms a fluidtight seal with the surface surrounding the bore 10a of the wall 10, and the internal surface of the nozzle simultaneously forms a fluidtight seal with the periphery of the cable to prevent passage of air, moisture, dust or other foreign matter through or around the nozzle. The surfaces bounding the slot 6 move toward each other when the conical face 5 penetrates into the opening 10a so that the width of the slot may be reduced to zero when the bolt 3 is driven home. The stiffening plate 2a compels the nozzle 1 to penetrate into the opening 10a when the bolt 3 is rotated in a sense to advance into the bore 10b, i.e., the plate 2a transmits motion to the nozzle.

If desired, the sleeve A may be provided with two or more radial extensions each of which may be secured to the wall 10 by separate fastening means. It is also possible to form the extension 2 with two or more apertures each of which may receive a separate bolt or a similar fastening device. Finally, it is also possible to form the nozzle 1 with two or more slots, particularly if the diameter of the opening 10a is much smaller than the maximal diameter of the conical face 5 so that the nozzle must undergo substantial compression during introduction into the opening 10a. All such modifications are so obvious that they will be readily comprehended without requiring additional illustrations.

Figure 5:
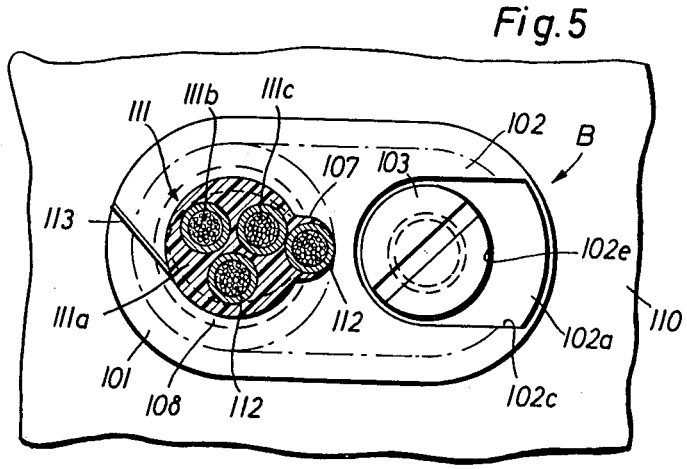
FIG. 5 is a top plan view of the structure of FIG. 4, showing the manner in which the ground conduit of a multiple-conductor cable is led through a radial zone of the through bore in the nozzle.

FIGS. 4 and 5 illustrate a modified insulating sleeve B which is applied to a slightly different wall 110 forming part of the housing for a current-consuming apparatus, such as an instrument, a machine or the like. The sleeve B again comprises a nozzle 101 whose conical outer face 105 is introduced into the conical outer portion 110a' of an opening in the wall 110. The lower portion 110a'' of this opening is of cylindrical shape, and it will be readily understood that the composite opening 110a', 110a'' may be replaced by a truly cylindrical opening whose diameter is at least slightly less than the maximal diameter of the conical face 105 to insure that the nozzle 101 is compressed radially inwardly when the face 105 is compelled to penetrate into such opening.

The outer side of the extension 102 is formed with a comparatively small depression 102c for a stiffening plate 102a whose aperture 102e receives a portion of a bolt 103, the latter also passing through the apertured extension 102 and being driven into the bore 110b of the wall 110. The underside 109 of the extension 102 is normally inclined with respect to the outer side of the wall 110 so that the distance between the parts 102, 110 increases in a direction toward the nozzle 101. The latter is formed with a substantially axially parallel through slot 113 which replaces the slot 6 and which enables the nozzle to contract when its face 105 is driven into the opening 110a', 110a''.

The through bore 104 of the nozzle 101 receives a multi-conductor cable 111 which comprises a comparatively soft jacket 111a so that the projections 108 of the nozzle may bite into the material of the jacket to hold the cable against axial displacements with respect to the sleeve. The cable 111 includes two conductors 111b, 111c and a ground conduit 112 which passes through the radial zone 107 of the bore 104.

It is assumed that the material of the sleeve B is rather stiff so that the nozzle 101 will penetrate into the opening 110a', 110a'' of the wall 110 even though the stiffening plate 102a does not surround the outer end of the bore 104.

A shoulder 101a at the upper end of the conical face 105 limits the extent to which the nozzle 101 may penetrate into the opening 110a', 110a''. This shoulder 101a is coplanar with the underside 109 of the extension 102.

If the cable 111 is without a ground conduit, the zone 107 of the through bore 104 may be sealed in any suitable manner. For example, the nozzle 101 may comprise a small integral rib which extends into the zone 107 (e.g., at the level of the projections 108) and which is broken away if the cable comprises a ground conduit. Otherwise, such rib seals the zone 107 and may constitute an additional projection which penetrates into the jacket 111a.

Referring to FIGS. 6 to 8, there is shown an insulating sleeve C which is very similar to the sleeve A or B excepting that it comprises three equidistant slots 206 which are comparatively short in that their axial length approximates the axial length of the conical face 205. The extension 202 is formed with a depression 202c for the head of a bolt 203, but the material of the sleeve C is of such stiffness that the plate 2a or 102a may be dispensed with, i.e., the nozzle 201 will penetrate into the opening 10a of the wall 10 when the bolt 203 is driven home to move the underside 209 of the extension 102 against the outer side of the wall 10. The bore 204 of the nozzle 201 again comprises a radially outwardly extending zone 207 for a ground conduit of a cable which passes through the nozzle. In this embodiment, the nozzle 201 comprises four annularly arranged projections 208 which are separated from each other by the slots 206 and by the zone 207.

FIGS. 9 to 11 illustrate a further insulating sleeve D which again comprises a nozzle 301 having a conical outer face 305 at that end thereof which is first to enter the bore 10a of a wall structure 10, and an extension 302 which is formed with an aperture 302b for a fastening bolt 303 which secures the sleeve to the wall structure. The nozzle 301 is provided with a through bore 304 and with four equidistant radially outwardly extending slots 306 each of which comprises a comparatively short outer section and a longer inner section. The inner sections of the slots 306 extend almost from the lower to the upper axial end of the bore 304, as viewed in FIG. 9 or 11. Such configuration of the slots adds to the deformability of the nozzle and insures that the nozzle will properly clamp a cable even if its material is comparatively stiff. The sleeve D further comprises an annular sealing collar 315 one end portion of which is integral with the upper end portion of the nozzle and the remainder of which surrounds the nozzle and is separated therefrom by an annular recess 314 which is comparatively deep and thereby adds to the flexibility of the nozzle. The edge portion of the collar 315 abuts against the outer side of the wall structure 10 when the sleeve is properly secured in place and the collar thus provides a second seal for the cable which passes through the bore 304. As shown, the nozzle 301 comprises a series of annularly arranged projections 308 which extend into the bore 304 to penetrate into the jacket 311a of a cable 311 passing through the nozzle. The bore 304 is without a radial zone for a ground conduit, but it will be readily understood that the sleeve D may be modified to accommodate cables with ground conduits. The number of slots 306 may be greater or less than shown in FIGS. 9 to 11.

The underside 309 of the extension 302 makes an acute angle with the axis of the bore 304, and it will be noted that the axial length of the collar 315 is less than the axial length of the nozzle 301 so that at least a portion of the conical outer face 305 projects beyond the collar. The opening 10a is bounded by a conical surface but the sleeve D may be used on wall structures with cylindrical openings as long as the diameters of such openings are at least slightly less than the maximum diameter of the conical face 305.

FIG. 11 shows that the projections 308 actually penetrate into the jacket 311a of the cable 311. As a rule, the lip 315 is more readily deformable than the nozzle 301.

Figure 12:
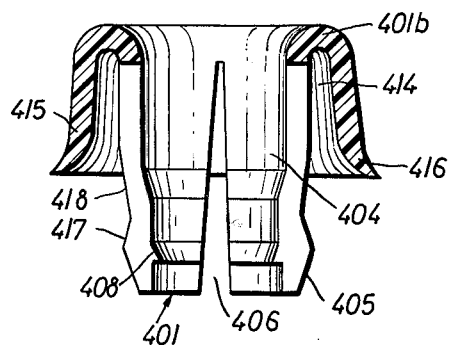
FIG. 12 is an axial section through a greatly simplified insulating sleeve of the self-locking or self-anchoring type.
Figure 13:
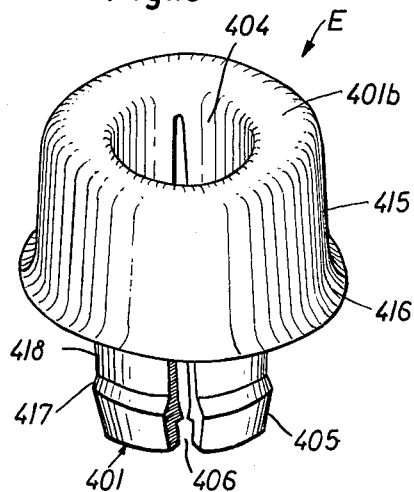
FIG. 13 is a perspective view of the self-locking sleeve.

Referring finally to FIGS. 12 and 13, there is shown a greatly simplified insulating sleeve E which is of the self-locking or self-anchoring type. This sleeve is without an extension and merely comprises a nozzle 401 and a more readily deformable annular sealing collar 415 which is integral with the upper axial end 401b of the nozzle and which surrounds a portion of the nozzle but is shorter than the latter. The lower edge portion 416 of the collar 415 diverges radially outwardly and comes into abutment with one side of a wall structure when the nozzle 401 extends into the opening of such wall structure. This nozzle is again provided with a through bore 404 which may receive a cable and with inwardly extending projections 408 which bite into the material of the cable to hold it against axial and/or angular movement. The outer side of the nozzle 401 is configurated in a novel way to insure that the nozzle contracts radially inwardly when it is driven into an opening of smaller diameter and also that the nozzle remains anchored in a wall structure as soon as its conical outer face 405 projects beyond the opening in the wall structure. As shown in FIG. 12, the outer side of the nozzle 401 comprises the aforementioned conical outer face 405 which diverges toward the end portion 401b, a second conical outer face 417 which is adjacent to the face 405 but which diverges in the opposite direction, and a third conical outer face 418 which diverges in the same direction as but whose conicity is different from that of the face 405. When the nozzle 401 is driven into an opening to such an extent that its conical face 405 projects beyond one end of the opening, the face 417 provides a shoulder which prevents unintentional extraction of the nozzle, and the face 418 bears against the surface surrounding the opening in the wall structure to maintain the nozzle in compressed condition.

In the embodiment of FIGS. 12 and 13, the nozzle 401 of the sleeve E is formed with four equidistant radial slots 406 which extend from the lower end toward but short of the upper end of the bore 404.

All an operator has to do is to string the sleeve E onto the jacket of a cable and to thereupon introduce the nozzle 401 into the opening in a wall structure so that the conical face 405 is leading. The nozzle comes to rest when the face 405 extends beyond the opening in the wall structure so that the surface bounding such opening abuts against the conical face 417 or 418. The nozzle is then compressed and provides a sealing ring around the cable which passes through the bore 404, and the edge portion 416 of the collar 415 provides a second seal by engaging the outer side of the wall structure. In order to extract the sleeve E, the operator must exert a force which is sufficient to cause withdrawal of the nozzle 401 from the opening in the wall structure.

The major portion of the collar 415 is separated from the outer side of the nozzle 401 by a deep annular recess 414 which adds to the flexibility or deformability of the sleeve.

It will be readily understood that the sleeve E may be modified in a number of ways without departing from the spirit of my invention. For example, the axial length of the slots 406 may be less than shown in FIGS. 12 and 13, the number of such slots may be less than or it may exceed four, and the slots may be replaced by a through slot such as the slot 113 of the sleeve B. It is also possible to replace the projections 408 by otherwise configurated projections, such as teeth, serrations or the like. If the material of the sleeve is sufficiently stiff, the sleeve may withstand substantial axial stresses without permitting any axial movements of the cable and without permitting undesired withdrawal of the nozzle from the opening in a wall structure. However, the elasticity of the sleeve should be sufficient to permit rapid insertion of the nozzle and to insure that the nozzle bears against the surface of the wall structure and against the cable with a requisite force which prevents or which at least hinders axial movements of the cable.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An insulating sleeve, particularly for guiding electric cables through openings provided in the housing of current-consuming apparatus, said sleeve comprising a radially inwardly compressible nozzle of elastic material, said nozzle having a cable-receiving through bore having a first and a second end and an outer face, the dimensions of said nozzle being such that upon insertion into said opening the wall surrounding said opening exerts a pressure upon said outer face to contract said nozzle radially inwardly and hold a cable received in said bore against axial movement; and a collar comprising a first portion which is integral with said nozzle at said first end and a second portion which surrounds said nozzle, said sleeve having an annular substantially axially extending recess having an open end spaced from said first end and disposed between the second portion of said collar and said nozzle.

2. A sleeve as set forth in claim 1, wherein the axial length of the second portion of said collar is less than the axial length of said nozzle.

3. A sleeve as set forth in claim 1, wherein said nozzle is provided with substantially axially parallel slot means extending from the first toward but short of the second end of said bore, said recess surrounding at least a portion of said slot means.

4. A sleeve as set forth in claim 1, wherein said nozzle is provided with a plurality of substantially axially parallel slots extending from the first toward but short of the second end of said bore, each of said slots having an inner section which is adjacent to said bore and an outer section, the axial length of said inner sections being greater than the axial length of the respective outer sections and at least a portion of each of said slots being surrounded by said recess.

5. An insulating sleeve, particularly for guiding electric cables through openings provided in the housings of current-consuming apparatus, said sleeve comprising a radially inwardly compressible nozzle of elastic material, said nozzle having a cable-receiving through bore having a first and a second axial end and a conical outer face provided at said second end and diverging toward said first end of said bore, the dimensions of said nozzle being such that upon insertion into said opening the wall surrounding said opening exerts a pressure upon said outer face to contract said nozzle radially inwardly and hold a cable received in said bore against axial movement; and a substantially annular collar comprising a first portion which is integral with said nozzle adjacent said first end and a second portion which surrounds said nozzle, said sleeve having an annular substantially axially extending recess having an open end spaced from said first end and disposed between the second portion of said collar and said nozzle.

6. A sleeve as set forth in claim 5, wherein said nozzle is provided with at least one additional conical outer face disposed between said first mentioned face and said other end of the bore, the conicity of said additional face being different from the conicity of said first mentioned face.

7. A sleeve as set forth in claim 5, wherein said nozzle is provided with a second conical outer face located intermediate said first mentioned face and said other end of the bore, said second face diverging in a direction toward said one end of the bore to provide a retaining shoulder when the nozzle is inserted into and when said first mentioned face extends beyond an opening.

8. An insulating sleeve, particularly for guiding electric cables of the type having a ground conduit through openings provided in the housings of current-consuming apparatus, said sleeve comprising a radially inwardly compressible nozzle of elastic material having a cable-receiving through bore and a conical outer face located at one end and diverging toward the other end of said bore, the dimensions of said nozzle being such that upon insertion into said opening the wall surrounding said opening exerts a pressure upon said outer face to contract said nozzle radially inwardly and hold a cable received in said bore against axial movement; and an annular sealing collar integral with said nozzle at said other end of said bore, said collar surrounding a portion of said nozzle and having an outwardly diverging annular sealing edge portion at that end thereof which is distant from said other end of said bore, said sleeve having an annular substantially axially extending recess open at said sealing edge and extending between said nozzle and said collar toward but short of said other end of said bore.

9. An insulating sleeve, particularly for guiding electric cables through openings provided in the housings of current-consuming apparatus, said sleeve comprising a radially inwardly compressible nozzle of elastic material, said nozzle having a cable-receiving through bore and a conical outer face located at one end and diverging toward the other end of said bore, the dimensions of said nozzle being such that upon insertion into said opening the wall surrounding said opening exerts a pressure upon said outer face to contract said nozzle radially inwardly and hold a cable received in said bore against axial movement; an apertured lateral extension integral with said sleeve at a point adjacent to said other end of said bore and having a collar portion surrounding said nozzle, said sleeve having an annular substantially axially extending recess having an open end spaced from said other end of said bore and extending between said nozzle and said collar portion; and fastening means passing through said extension for securing the sleeve to the housing of a current-consuming apparatus.

10. In a current-consuming apparatus, in combination, a housing including a wall having an inner side, an outer side and an opening extending between said sides; an insulating sleeve having a slotted nozzle received in said opening and consisting of elastic material, said nozzle having a cable-receiving through bore and a conical outer face provided at one end and diverging toward the other end of said bore, an apertured extension integral with the nozzle at said other end of said bore and having a collar portion surrounding said nozzle, said extension having an underside adjacent to one side of said wall, said underside being normally inclined with respect to said one side so that the distance between said one side and said underside diminishes in a direction away from said nozzle, said sleeve having an annular substantially axially extending recess having an open end spaced from said other end of said bore and extending between said nozzle and said collar portion; fastening means passing through said extension and secured to said wall to bias the underside of said extension into face-to-face abutment with said one side whereby the conical face of said nozzle is compelled to penetrate into said opening; and a cable extending through said bore, the dimensions of said nozzle being such that it contracts radially inwardly and holds the cable against axial movement in said bore when said conical face is compelled to penetrate into said opening.

11. An insulating sleeve as set forth in claim 9, further comprising stiffening means adjacent to the outer side of said extension.

12. A sleeve as set forth in claim 11, wherein said stiffening means is a rigid plate which is recessed into said extension.

13. A sleeve as set forth in claim 12, wherein said plate comprises a ring-shaped portion which is recessed into said nozzle and surrounds the second end of said bore.

14. An insulating sleeve as set forth in claim 9, wherein said extension has an underside facing toward said one end and making an acute angle with the axis of said bore.

15. An insulating sleeve as set forth in claim 1, further comprising cable engaging projections extending into said bore for engaging a cable received in said bore when the nozzle is subjected to radial compression.

References Cited by the Examiner

UNITED STATES PATENTS

| | | | |
|---|---|---|---|
| 934,995 | 9/09 | Church | 285—207 |
| 2,545,514 | 3/51 | Erb | 174—153 |
| 2,664,458 | 12/53 | Rapata | 174—153 |
| 2,927,807 | 3/60 | Campbell | 285—128 |

FOREIGN PATENTS

| | | |
|---|---|---|
| 647,263 | 8/62 | Canada. |
| 823,722 | 11/59 | Great Britain. |

OTHER REFERENCES

German printed application, Lux, No. 1,088,126, Sept. 1, 1960.

JOHN F. BURNS, *Primary Examiner.*
JOHN P. WILDMAN, *Examiner.*